Nov. 24, 1953   J. W. DUNN   2,659,980
ADJUSTABLE MARKING RULE
Filed March 7, 1951

INVENTOR.
Joseph W. Dunn
BY
Wilfred E. Lawson
ATTORNEY

Patented Nov. 24, 1953

2,659,980

UNITED STATES PATENT OFFICE 2,659,980

ADJUSTABLE MARKING RULE

Joseph W. Dunn, Los Angeles, Calif.

Application March 7, 1951, Serial No. 214,383

1 Claim. (Cl. 33—174)

This invention relates to the class of geometrical instruments and is directed particularly to improvements in rules.

A primary object of the present invention is to provide a rule or gage device for use by carpenters or other building construction workmen, by means of which certain standard measurements may be easily and quickly made or laid off, as for example, in connection with the marking of centers or positions for studding, joists, rafters or the like.

Another object of the invention is to provide a rule or straight edge implement having means for supporting it along the edge of a sill or plate and having a number of spaced tongues of a width conforming to the usual thickness of studding, joists and the like, such tongues having their centers spaced in accordance with building code requirements for such studding, joists and the like, which is usually sixteen inches.

A further object of the invention is to provide an implement of the above described character, having a linear scale and a pointer movable therealong, whereby measurements may be made and points laid off between said tongues.

The invention will be best understood from a consideration of the following detailed description taken in connection with the accompanying drawing forming a part of the specification with the understanding, however, that the invention is not to be limited to the exact details of construction shown and described since obvious modifications will occur to a person skilled in the art.

Figure 1:
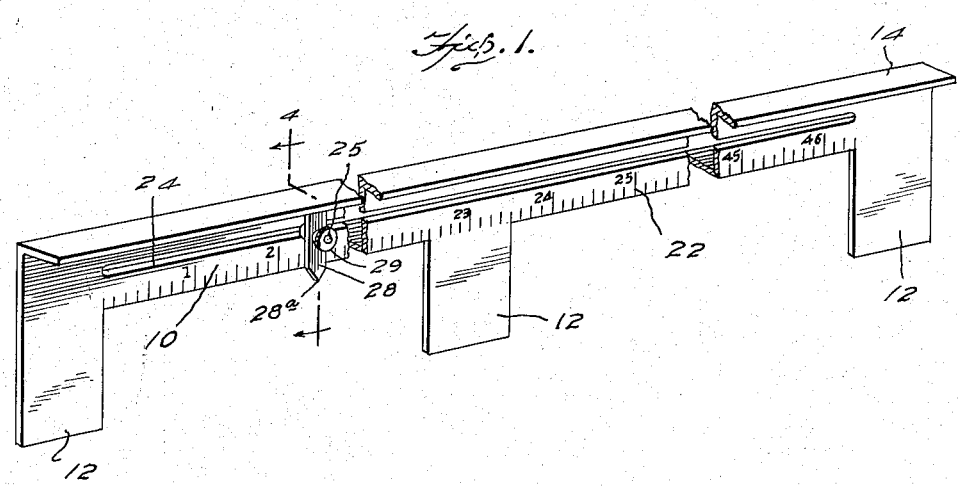
Figure 1 is a view in perspective of an instrument constructed in accordance with the present invention, parts being broken away.
Figure 2:
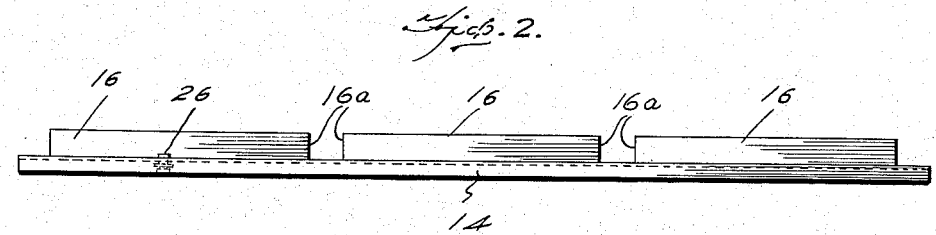
Figure 2 is a view in top plan of the same on a reduced scale.

Referring more particularly to the drawing the numeral 10 generally designates a flat bar of suitable width and thickness, which may be made of steel or any other suitable metal or other material. The bar may also be of any desired length. A preferred length is forty-nine and five-eighths inches, such length making possible the marking off of locations for four studs, joists or rafters on sixteen inch centers, assuming that such pieces of material would be of the usual one and five-eighths inch thickness.

From one longitudinal edge of the bar there extend a number of flat tongues 12, there being four in a bar of the above stated length, one at each end and two in between as shown. Such tongues would be of a width equal to the thickness of pieces of material being used, such as one and five-eighths inches as above stated and the longitudinal centers of the tongues would be sixteen inches apart.

Extending along the other longitudinal edge of the bar and projecting laterally, perpendicular to one flat side face is a hand lifting, or handling, flange 14.

On the other side of the bar from that from which the flange 14 projects, which other side or face might be identified as the back, projects a rest flange, or rest flanges, 16, which are along the edge of the bar from which the tongues extend, or the bottom edge, designated 18. These flanges 16 provide means for resting, or supporting, the device along the edge of a sill or plate, such as is shown in end elevation in Figure 3 and designated 20.

On one face of the bar 10, here shown as the front face, there is laid off a linear scale 22, here shown as divided into one inch main divisions, which are subdivided into eighths.

Formed in the bar 10, lengthwise thereof, is a slot 24, the length of which is the same as the scale 22.

Extending through the slot 24 is a threaded pin 25 having a head 26 which engages against the back face of the bar.

On the pin 25 are two washers 27, and held between these washers 27, is a pointer 28, which has a suitable aperture for, and through which extends, the pin.

Threaded upon the free forward end of the pin is a nut 29, which binds the washers 27 and pointer 28 tightly against the front face of the bar.

The pointer 28 is in the form of a relatively long flat plate as shown, which is held parallel to the face of the bar, and an end of this plate is tapered to provide the point 28a, as shown.

By means of this adjustable pointer or indicator, various points may be measured and marked off between the spaced tongues.

Figure 3:
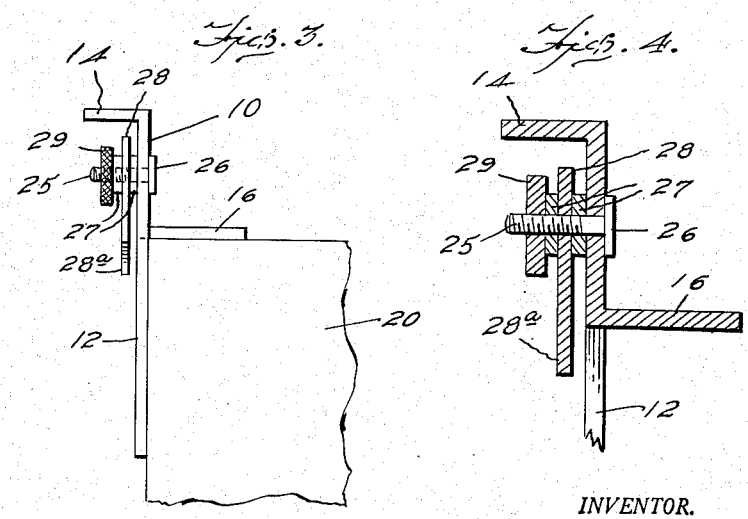
Figure 3 is a view in end elevation of the instrument showing the same applied.
Figure 4:
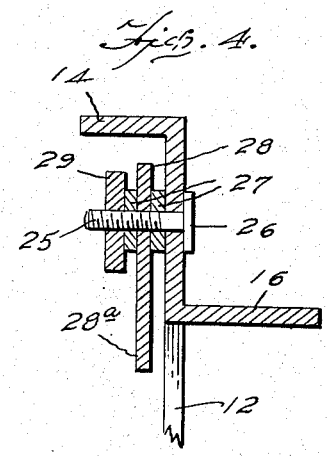
Figure 4 is a sectional view on an enlarged scale taken substantially on the line 4—4 of Figure 1.

It is believed than an understanding of the manner of using the present implement will be readily gained from the foregoing description. As previously stated, the tongues 12 are of a width equal to the thickness of the standard joist, rafter or studding, that is, one and five-eighths inches. These are spaced apart so that their longitudinal centers are sixteen inches apart, which is the usual spacing between centers for joists, studding and the like. Accordingly by placing the instrument as shown in Figure 3, upon a plate or sill between which joists are to be secured, or upon which studding is to be set up, the positions for the joists can be quickly marked, by running a pencil or scratch marker, across the face of the sill or plate, along both sides of each tongue 12, or the positions for studding can be marked off by running a pencil, or scratch marker across the top of the plate or sill along both end edges 16a of each of the rest flanges. Thus the plurality of rest flanges perform the double function of providing a supporting means and a marking guide.

Measurements to be noted between the tongues are made by means of the adjustable pointer in conjunction with the linear scale 22.

Where building codes specify different center distances than those here set forth, or joists, studs and rafters of different thickness, the widths of the tongues and the spacing between the centers thereof, will, of course, be changed accordingly.

I claim:

An instrument of the character set forth comprising a long flat bar having a top and a bottom longitudinal edge, a laterally projecting means along said bottom edge and upon one side face of the bar for supporting the bar along an edge of a supporting body such as a piece of timber, and means for locating positions of building elements on and lengthwise of said timber comprising flat tongue members equidistantly spaced along and extending from said bottom edge of said flat bar, there being a tongue at each end of the bar and other tongues between the end tongues, each of said tongues having a width equal to the thickness of the said building element and the tongues having their longitudinal centers spaced apart at predetermined distances, said laterally projecting means comprising longitudinally spaced flanges each extending the length of the space between two of said tongues, the spacing between adjacent ends of the flanges equaling the width of each tongue, a second flange extending along the top edge of the bar and directed oppositely from said spaced flanges, the bar having a lengthwise slot therein, the bar carrying a linear scale along one face, a pointer element disposed across the slot for coaction with said scale, and a nut and screw for adjustably securing the pointer element on the bar, the screw passing through the slot and pointer and having the nut threaded thereon, said pointer, nut and screw being below and covered by said second flange when the instrument is supported in horizontal position upon the piece of timber.

JOSEPH W. DUNN.

References Cited in the file of this patent

UNITED STATES PATENTS

| Number | Name | Date |
|---|---|---|
| 387,966 | Beckwith | Aug. 14, 1888 |
| 1,032,227 | Matheson | July 9, 1912 |
| 1,045,871 | Miller | Dec. 3, 1912 |
| 1,540,991 | Holmgren | June 9, 1925 |
| 1,668,684 | Koubek | May 8, 1932 |
| 2,326,412 | Taylor | Aug. 10, 1943 |
| 2,497,570 | Abshire | Feb. 14, 1950 |